US010754177B1

(12) United States Patent
Levich et al.

(10) Patent No.: US 10,754,177 B1
(45) Date of Patent: Aug. 25, 2020

(54) TRANSFORMATIVE EYEWEAR APPARATUS

(71) Applicant: H2W, Chatsworth, CA (US)

(72) Inventors: David Levich, West Hills, CA (US); Jordan Douglas Szymanowski, Los Angeles, CA (US)

(73) Assignee: H2W, Chatsworth, CA (US)

( * ) Notice: Subject to any disclaimer, the term of this patent is extended or adjusted under 35 U.S.C. 154(b) by 0 days.

(21) Appl. No.: 14/831,797

(22) Filed: Aug. 20, 2015

Related U.S. Application Data

(60) Provisional application No. 62/039,583, filed on Aug. 20, 2014.

(51) Int. Cl.
A41G 7/00 (2006.01)
G02C 11/02 (2006.01)
A41G 7/02 (2006.01)

(52) U.S. Cl.
CPC ............... G02C 11/02 (2013.01); A41G 7/02 (2013.01)

(58) Field of Classification Search
CPC .......... G02C 11/00; G02C 11/02; G02C 5/008
USPC ............ 351/51, 52, 158; 2/12, 13; D16/300, D16/306–312, 323
See application file for complete search history.

(56) References Cited

U.S. PATENT DOCUMENTS

| 2,677,133 | A | | 5/1954 | Hoffman, Jr. | |
| 2,748,528 | A | | 6/1956 | Bern | |
| 2,832,593 | A | | 4/1958 | Anderson | |
| D188,007 | S | * | 5/1960 | Pacelli | D16/307 |
| 3,009,163 | A | * | 11/1961 | Beauvais | A41G 7/00 2/206 |
| D232,379 | S | * | 8/1974 | Arner | D16/307 |
| 3,991,753 | A | | 11/1976 | Viesca | |
| 4,121,304 | A | | 10/1978 | Cooper | |
| D279,989 | S | * | 8/1985 | McNaughton | D16/307 |
| 4,715,702 | A | | 12/1987 | Dillon | |

(Continued)

FOREIGN PATENT DOCUMENTS

JP 2000-180801 A * 6/2000 ............. G02C 11/02

OTHER PUBLICATIONS

"U.S. Appl. No. 15/661,382, Non Final Office Action dated Nov. 8, 2018", 20 pgs.

(Continued)

Primary Examiner — Darryl J Collins
(74) Attorney, Agent, or Firm — Schwegman Lundberg & Woessner, P.A.

(57) ABSTRACT

Embodiments provide an eyewear apparatus that include an additional structural component that resembles a character. Although, the location of the additional structural component on the frame can vary depending on implementation, in at least one example, the additional structural component is located on the top of the frame of the eyewear apparatus such that the additional structural component conceals the forehead of a user when the user is wearing the eyewear apparatus. In at least one embodiment, the additional structural component may be located at any point along the frame, however, in some embodiments, the additional structural component is located on the top or the sides of the frame, e.g., such that the additional structural component does not interfere with the user's ability to see out of the eyewear apparatus.

8 Claims, 5 Drawing Sheets

(56) References Cited

U.S. PATENT DOCUMENTS

| | | | | |
|---|---|---|---|---|
| 4,798,455 | A | * | 1/1989 | Yoe ................... G02C 5/02 351/158 |
| 4,944,039 | A | * | 7/1990 | Dietrich ................ A41D 13/11 2/13 |
| 5,521,655 | A | | 5/1996 | Rhoad |
| D384,683 | S | * | 10/1997 | Martinant de Preneuf ................. D16/101 |
| 5,764,338 | A | * | 6/1998 | MacK .................. G02C 11/02 351/158 |
| 5,775,018 | A | * | 7/1998 | Steinborn ............. G02C 11/02 40/299.01 |
| D416,036 | S | * | 11/1999 | Wang .......................... D16/307 |
| D434,432 | S | * | 11/2000 | Wang .......................... D16/306 |
| D437,638 | S | | 2/2001 | Harwell, IV |
| 6,568,804 | B1 | * | 5/2003 | Lin ........................ G02C 11/02 351/158 |
| 7,475,980 | B2 | | 1/2009 | Tanir et al. |
| D704,253 | S | | 5/2014 | Szymanowski et al. |
| D729,308 | S | | 5/2015 | Szymanowski et al. |
| D748,184 | S | * | 1/2016 | Szymanowski ............. D16/306 |
| 10,568,375 | B1 | | 2/2020 | Levich |
| 2003/0014800 | A1 | * | 1/2003 | Meyers .................... A41G 7/00 2/15 |
| 2004/0237172 | A1 | | 12/2004 | Quinn |
| 2008/0117381 | A1 | * | 5/2008 | Chen ...................... G02C 11/02 351/52 |
| 2014/0204332 | A1 | * | 7/2014 | Moore ................... G02C 11/02 351/52 |
| 2017/0356097 | A1 | | 12/2017 | Eagerton |

OTHER PUBLICATIONS

"U.S. Appl. No. 15/665,791, Non Final Office Action dated Oct. 23, 2018", 16 pgs.
"Webpage sunstaches.com", archived Dec. 2014 (Year: 2014), [Online]. Retrieved from the Internet: <URL: https://web.archive.org/web/20141222070740/https://sunstaches.com/>, (2014), 3 pgs.
"U.S. Appl. No. 15/476,231, Non Final Office Action dated Feb. 14, 2019", 10 pgs.
"U.S. Appl. No. 15/661,382 Examiner Interview Summary dated Apr. 16, 2019", 4 pgs.
"U.S. Appl. No. 15/661,382, Response filed May 7, 2019 to Non Final Office Action dated Nov. 8, 2018", 12 pgs.
"U.S. Appl. No. 15/665,791, Examiner Interview Summary dated Jan. 15, 2019", 5 pgs.
"U.S. Appl. No. 15/665,791, Non Final Office Action dated Mar. 5, 2019", 13 pgs.
"U.S. Appl. No. 15/665,791, Response filed Jan. 23, 2019 to Non Final Office Action dated Oct. 23, 2018", 10 pgs.
"U.S. Appl. No. 15/476,231, Final Office Action dated Jul. 18, 2019", 11 pgs.
"U.S. Appl. No. 15/476,231, Response filed Jun. 14, 2019 to Non Final Office Action dated Feb. 14, 2019", 9 pgs.
"U.S. Appl. No. 15/661,382, Final Office Action dated Jul. 26, 2019", 19 pgs.
"U.S. Appl. No. 15/665,791, Final Office Action dated Aug. 13, 2019", 15 pgs.
"U.S. Appl. No. 15/665,791, Response filed Jul. 3, 2019 to Non-Final Office Action dated Mar. 5, 2019", 11 pgs.
"U.S. Appl. No. 15/665,791, Response filed Oct. 16, 2019 to Final Office Action dated Aug. 13, 2019", 10 pgs.
"Electroplating", Wikipedia, [Online] Retrieved from the Internet: <URL: https://en.wikipedia.org/wiki/Electroplating>, 9 pgs.
Kulkarni, Darshan, "Protect Your Eyes with Mirror Sunglasses", Lenspick Blog, [Online] Retrieved from the Internet: <URL: https://www.lenspick.com/blog/reflect-your-style-with-mirror-sun glasses/>, (Aug. 28, 2015), 3 pgs.
"U.S. Appl. No. 15/476,231, Notice of Allowability dated Nov. 6, 2019", 2 pgs.
"U.S. Appl. No. 15/476,231, Notice of Allowance dated Oct. 30, 2019", 7 pgs.
"U.S. Appl. No. 15/476,231, Response filed Oct. 18, 2019 to Final Office Action dated Jul. 18, 2019", 9 pgs.
"U.S. Appl. No. 15/661,382, Non Final Office Action dated Nov. 4, 2019", 18 pgs.
"U.S. Appl. No. 15/661,382, Response filed Mar. 4, 2020 to Non Final Office Action dated Nov. 4, 2019", 10 pgs.
"U.S. Appl. No. 15/661,382, Response filed Oct. 18, 2019 to Final Office Action dated Jul. 26, 2019", 10 pgs.
"U.S. Appl. No. 15/665,791, Examiner Interview Summary dated Oct. 22, 2019", 4 pgs.
"U.S. Appl. No. 15/665,791, Non Final Office Action dated Nov. 7, 2019", 11 pgs.
"U.S. Appl. No. 15/665,791, Response filed Mar. 9, 2020 to Non Final Office Action dated Nov. 7, 2019", 8 pgs.

\* cited by examiner

TRANSFORMATIVE EYEWEAR APPARATUS

CLAIM TO PRIORITY

This application claims priority to U.S. provisional application No. 62/039,583, filed on Aug. 20, 2014, which is expressly incorporated by reference herein in its entirety.

BACKGROUND

Some conventional eyewear apparatuses include a frame to house tinted or clear lenses for protecting a user's eyes from the sun. In some aspects, the frame is shaped in a decorative fashion to enhance how the user looks; for example, the frame can have circular lens apertures for housing the lenses. With the exception of novelty eyewear for purposes of humor, conventional eyewear products may lack an ability to provide functional additions to enable additional types of uses for the eyewear.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION

Aspects of the subject technology address the problems of conventional eyewear implementations, which provide limited options for expanding/changing the functional design of an eyewear apparatus. In particular, aspects of the technology provide an additional structural component to a frame of an eyewear apparatus that alters an appearance of a user.

In certain implementations, the subject technology provides for an additional structural component that resembles a face of a popular television or cartoon character. Although, the location of the additional structural component on the frame can vary depending on implementation, in at least one example, the additional structural component is located on the top of the frame such that the additional structural component conceals the forehead of a user when the user is wearing the eyewear apparatus. In at least one embodiment, the additional structural component may be located at any point along the frame, however, in some embodiments, the additional structural component is located on the top or the sides of the frame, e.g., such that the additional structural component does not interfere with the user's ability to see out of the eyewear apparatus.

Figure 1:
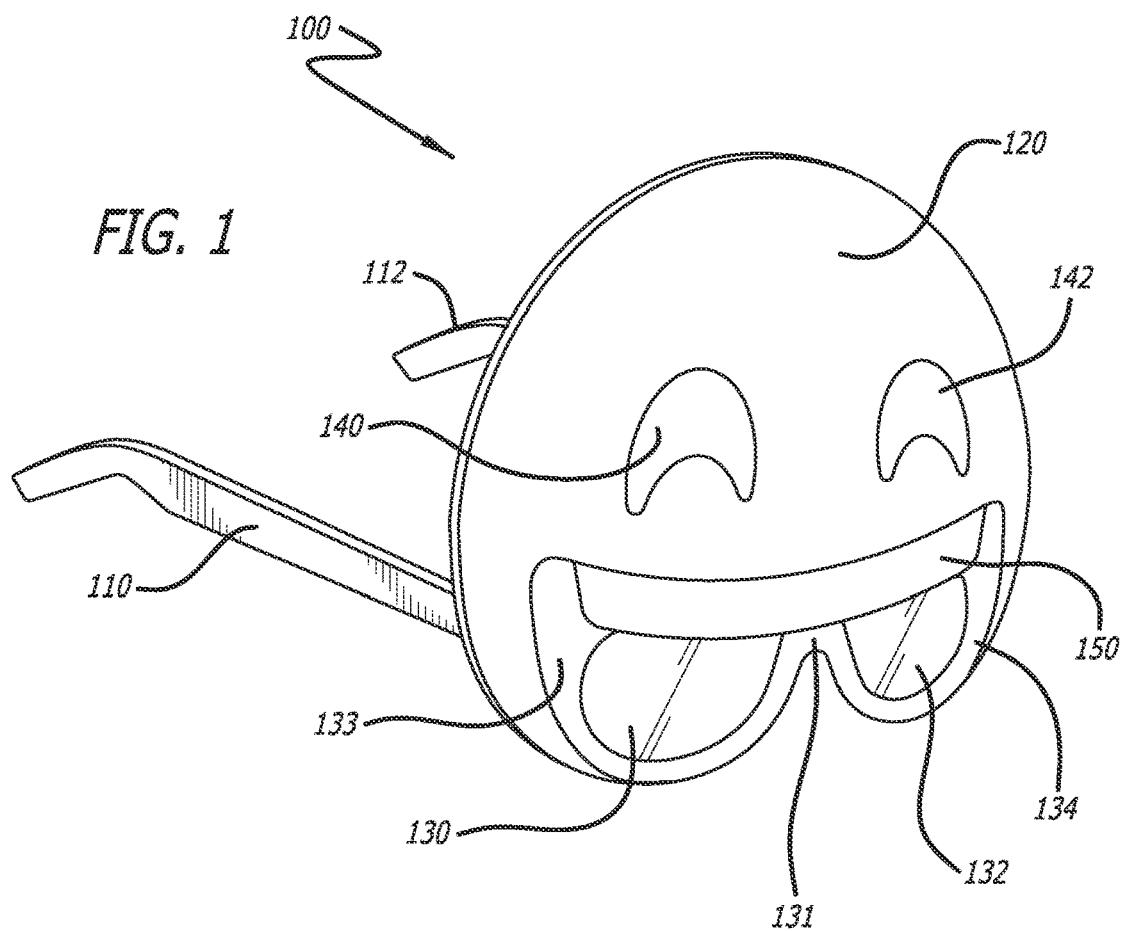
FIG. 1 conceptually illustrates an example transformative eyewear apparatus in accordance with at least one embodiment.

FIG. 1 conceptually illustrates an example transformative eyewear apparatus in accordance with at least one embodiment.

As illustrated in FIG. 1, an eyewear apparatus 100 is provided (e.g., in a shape of a character's head), that includes a structural component (e.g., a character's face or portion thereof) of a forehead frame 120 for making a user, when wearing the eyewear apparatus, resemble a character. The eyewear apparatus 100 resembles a character's whole face with lenses that represent or resemble the character's mouth. FIG. 1 further shows eyewear apparatus 100 with a right eye frame 133, a left eye frame 134, a right earpiece 110 and a left earpiece 112, which are each situated below the forehead frame 120. The right eye frame 133 contains a lens 130 and the left eye frame 134 contains a lens 132. Each lens may be constructed of a suitable material such as glass, plastic, composites, etc., and in some embodiments may be tinted and/or include UV (ultraviolet) light protection. The eyewear apparatus 100 includes a portion 150 which resembles or represents the character's mouth (e.g., depicting a smile or some other mouth expression such as the mouth being open), and portions 140 and 142 which resemble respective eyes of the character. It is appreciated that the portions 140, 142, and 150 may be implemented using any suitable shape (e.g., other types of polygons, circles, ovals, and free form shapes, etc.). Moreover, although the portions 140, 142, and 150 are shown as being included as part of the forehead frame 120, in at least one embodiment, the one or more of the aforementioned portions may be coupled or attached to other parts of the forehead frame 120. For example, the portions 140 and 142 may be attached to an upper portion of the forehead frame 120 and extend above the forehead frame 120.

As illustrated, the forehead frame 120 may be coupled to the left and right eye frames using any suitable method, e.g., using screws to attach the structural component to the frame, or in one embodiment by forming the forehead frame 120 and frame together as a single piece included in the eyewear apparatus 100. The eyewear apparatus 100 further includes a bridge portion 131 for a nose of a user of the eyewear apparatus 100. Although the forehead frame 120 is shown with a particular shape and size in the example FIG. 1, it is appreciated that different sizes and shapes may be used for implementing the forehead frame 120 without departing from the scope of the subject technology. In an example, the forehead frame 120 may be substantially smaller and made to resemble a detail or accessory of a character's costume (e.g., a mask or portion thereof). In another example, the forehead frame 120 may include a portion that resembles a character's hair (or portion thereof). In another example, the forehead frame 120 may resemble a portion of the character's facial appearance (e.g., not limited to an element of the character's costume and not resembling a character's entire face, such as only the top half of the character's face or head). In yet another example, the forehead frame 120 may be implemented resemble a character that is wearing an eyewear apparatus itself (e.g., a person with glasses and/or hair). In another example, the forehead frame 120 may be implemented to not resemble or include a mouth of the character (or at least a portion thereof), and/or the eye frames and/or the lenses may be implemented to also not resemble or include a mouth of the character (e.g., the forehead frame 120 resembling a portion of the character's head only without the mouth).

It is understood that FIG. 1 is an example of certain embodiments of the subject technology, and that other aesthetic designs, mechanical configurations, and various materials, can be used without departing from the technology. It is further understood that various colors and shapes of frames and lenses may be used. Various colors and shapes of frames and lenses may be used to complement the forehead frame 120, including for example: different colors (e.g., blue, black, red, green, purple, clear, transparent, etc.) and/or different shapes (e.g., circular, ovular, square, elliptical, etc.). Any other suitable color and/or shape may be used for implementing the disclosed eyewear apparatus 100 in FIG. 1.

Figure 2:
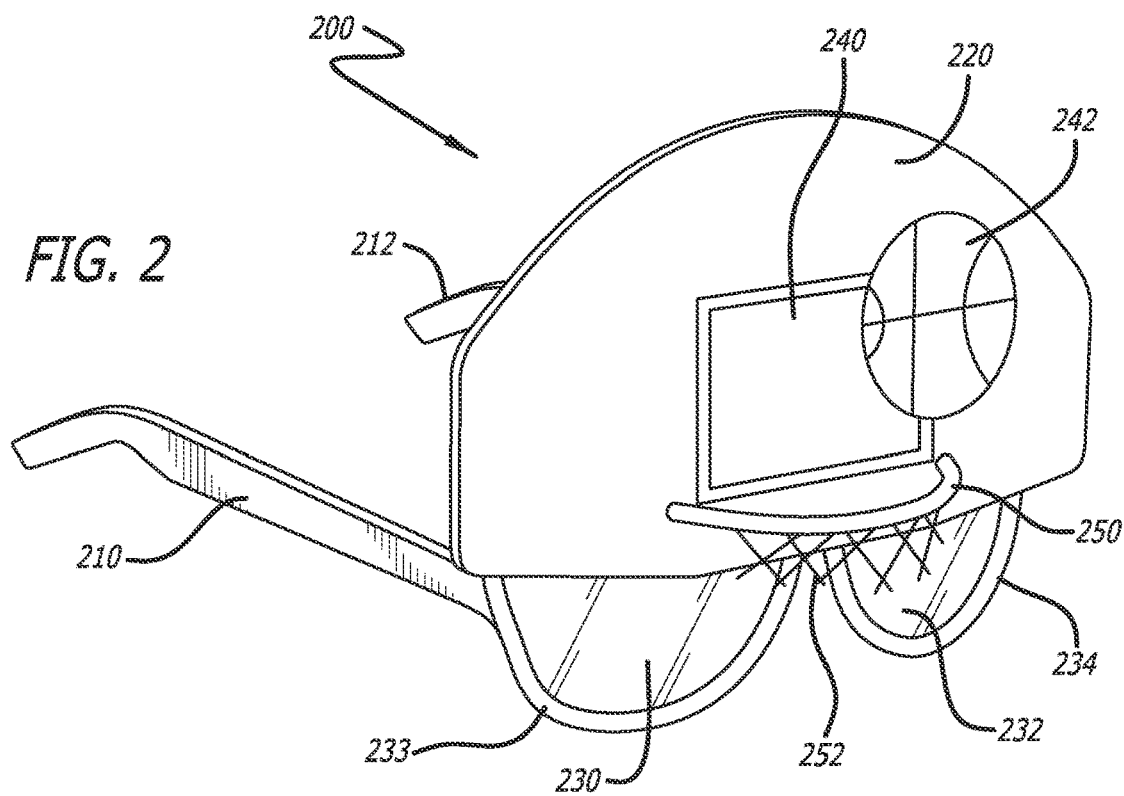
FIG. 2 conceptually illustrates an example transformative eyewear apparatus in accordance with at least one embodiment.

FIG. 2 conceptually illustrates an example transformative eyewear apparatus in accordance with at least one embodiment.

As illustrated in FIG. 2, an eyewear apparatus 200 is provided that includes a structural component (e.g., resembling non-protective sports equipment or goods or a portion thereof) of a forehead frame 220 for making a user, when wearing the eyewear apparatus, have an appearance of non-protective sports equipment or goods. The eyewear apparatus 200 resembles a basketball goal and ball. FIG. 2 further shows the eyewear apparatus 200 with a right eye frame 233, a left eye frame 234, a right earpiece 210 and a left earpiece 212, which are each situated below at least (or substantially thereof) an upper portion of forehead frame 220. The forehead frame 220, in this example, is in the shape of a basketball backboard, which is curved at a top portion of the forehead frame 220 and substantially rectangular in a bottom portion of the forehead frame 220. The right eye frame 233 contains a lens 230 and the left eye frame 234 contains a lens 232. As further illustrated, the eyewear apparatus 200 includes a portion 240 which resembles a rectangular "shooter's square" of the basketball backboard, and a portion 242 which resembles a basketball. The eyewear apparatus 200 includes a basketball hoop portion 250 that extends outward from the forehead frame 220. In an example, a basketball net 252 is attached to the basketball hoop portion 250.

Figure 3:
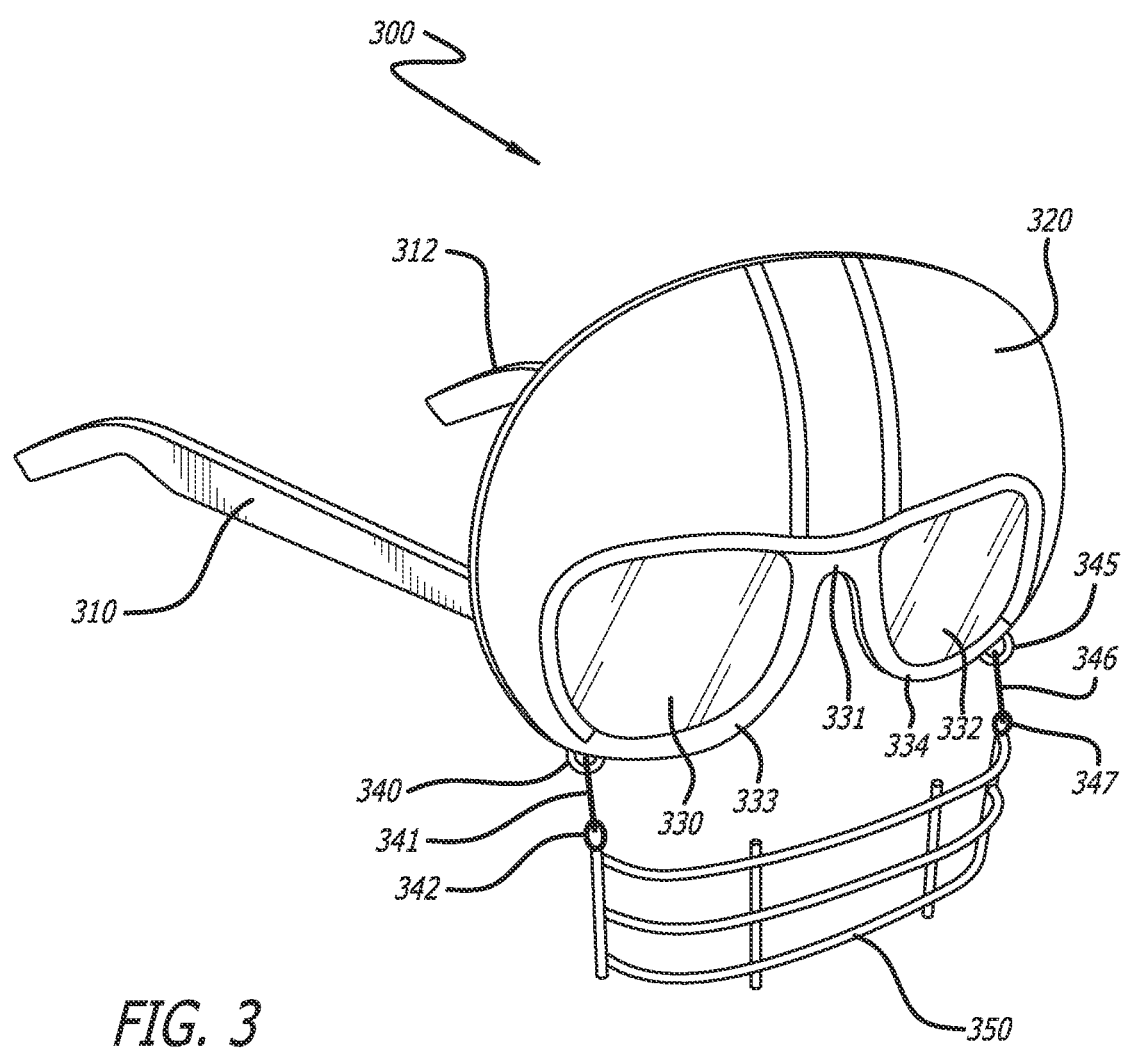
FIG. 3 conceptually illustrates an example transformative eyewear apparatus in accordance with at least one embodiment.

FIG. 3 conceptually illustrates an example transformative eyewear apparatus in accordance with at least one embodiment.

As illustrated in FIG. 3, an eyewear apparatus 300 is provided that includes a structural component (e.g., resembling a sports protective headwear or helmet or a portion thereof) of a forehead frame 320 for making a user, when wearing the eyewear apparatus, have an appearance of wearing a sports protective headwear or helmet. The example eyewear apparatus 300 resembles a football helmet. FIG. 3 further shows the eyewear apparatus 300 with a right eye frame 333, a left eye frame 334, a right earpiece 310 and a left earpiece 312, which are each situated below at least (or substantially thereof) an upper portion of the forehead frame 320. The forehead frame 320, in this example, is in the shape of a football helmet, which is curved at a top portion of the forehead frame 320. The right eye frame 333 contains a lens 330 and the left eye frame 334 contains a lens 332. The eyewear apparatus 300 further includes a bridge portion 331 for a nose of a user of the eyewear apparatus 300.

As further illustrated, the eyewear apparatus 300 includes multiple mechanical clips for use in coupling an attachment to the eyewear apparatus 300. Although, the location and number of clips can vary depending on design implementation, in at least one example, two clips 340 and 345 may be provided on an eyewear apparatus, e.g., for coupling a hanging attachment that hangs beneath a nose of the user. In practice, the clips may be attached to the apparatus at any point along the frame, however, in some preferred implementations, the clips can utilize attachment points disposed underneath a frame of the eyewear apparatus, e.g., such that coupled attachments do not interfere with a wearer's ability to see out of the lenses of the eyewear apparatus. By way of example, clips may be provided at points beneath a frame of the eyewear apparatus 300, e.g., underneath corners formed between an edge of a respective earpiece, and lenses of the eyewear apparatus.

As shown in FIG. 3, the eyewear apparatus 300 includes a hanging apparatus 350 for providing at least an aesthetic completeness of the depicted eyewear piece (e.g., a helmet grill). As illustrated, the hanging apparatus 350 is mechanically coupled to the eyewear apparatus 300, e.g., using two clips 340 and 345 cooperated with mechanical loops 341 and 346 disposed below of the left and right eye frames 333 and 334, in which the mechanical loops 341 and 346 are coupled with clips 342 and 347 disposed on opposite sides of the hanging apparatus 350. FIG. 3 illustrates the use of a jump ring for mechanically coupling the hanging apparatus 350 to the left and right eye frames of the the eyewear apparatus 300; however, it is understood that various types of hooks, clasps or fasteners may be used.

Various mechanical elements may be used for securing an eyewear attachment (e.g., the aforementioned hanging apparatus), including for example: eye hook/s, eye latch/s, eye clasp/s, jump ring/s, etc. Additionally, it is understood that clips or clasps/fasteners can include different numbers of links, jump rings and/or chains, without departing from the scope of the subject technology. Additionally, various clasping mechanism may be used, for example, to fasten an attachment to a clip that is, in turn, fastened to an eyewear apparatus. In this regard, different attachment mechanisms may be used, including but not limited to, twist fasteners, clasps and/or snaps, etc.

The advantages of the example of FIG. 3 include allowing an outside viewer, when looking at the eyewear apparatus 300 worn by another user, to perceive an additional transformative element as separate/detached from the main portion of eyewear apparatus 300. Further, the eyewear attached (e.g., the hanging apparatus described above) allows an additional transformative element to sway and move in directions independent from the main portion of eyewear apparatus 300. Further, although the example of FIG. 3 was directed to a sports helmet, it is appreciated that other embodiments may resemble a character, object, or animal with and additional transformative feature(s) connected to structural component via a dangling/pliable mechanism (e.g., a skull with a hanging attachment that resembles a mouth or a mustache, or a monkey with a hanging attachment that resembles a banana mustache).

As it is understood that various clip types/geometries may be used, it is also understood that various material types can also be used, without departing from the subject technology. For example, clips made of various materials, e.g., metal, metal alloys, plastic, polymer and/or wood may be used.

Figure 4:
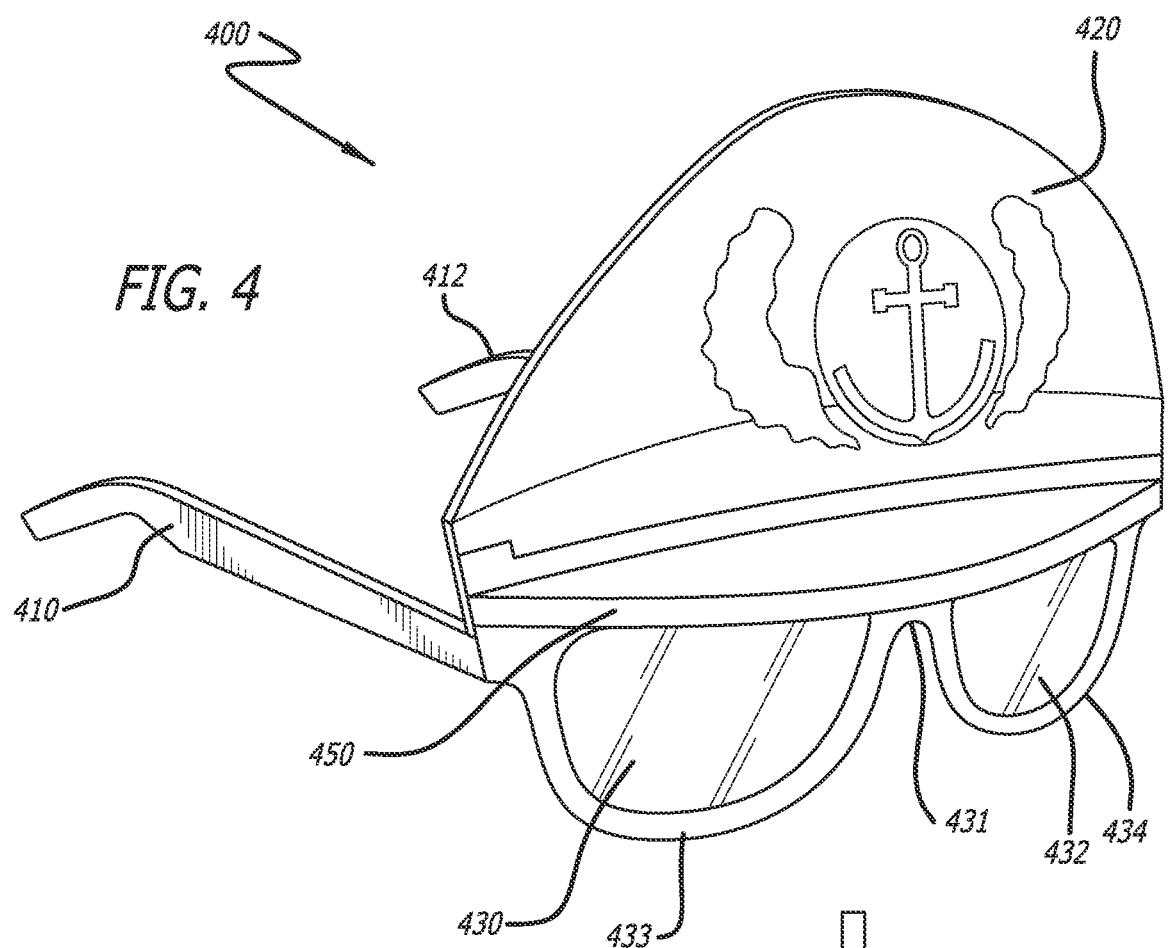
FIGS. 4 and 5 conceptually illustrate an example transformative eyewear apparatus in accordance with at least one embodiment.
Figure 5:
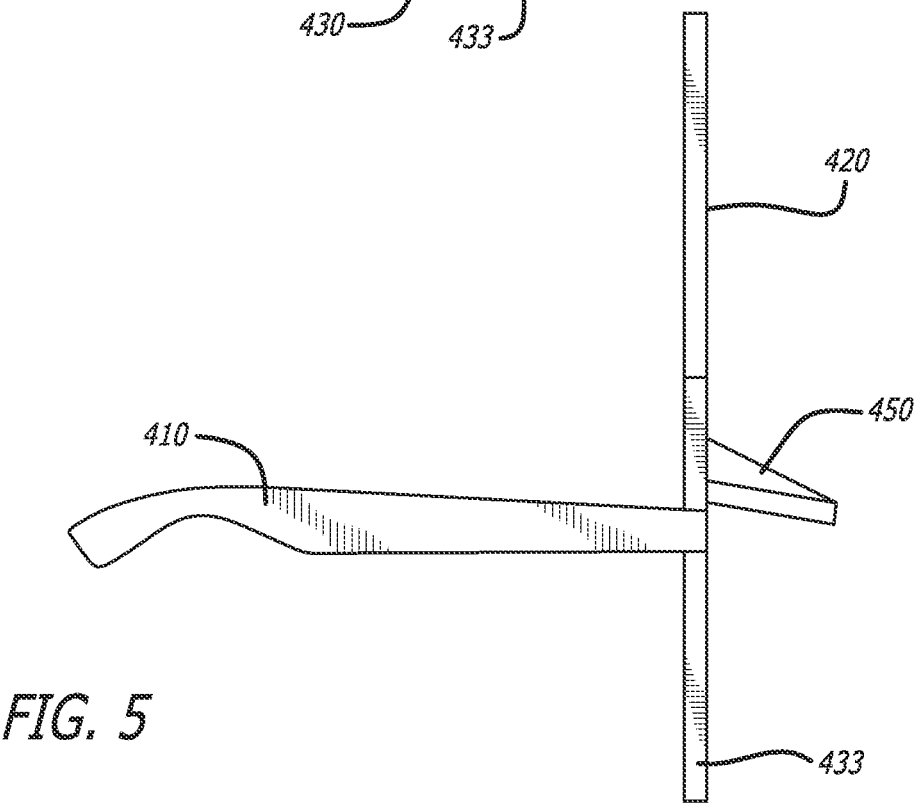

FIGS. 4 and 5 conceptually illustrates an example transformative eyewear apparatus in accordance with at least one embodiment.

As illustrated in FIG. 4, an eyewear apparatus 400 is provided that includes a structural component (e.g., resembling a headwear article or accessory or a portion thereof) of a forehead frame 420 for making a user, when wearing the eyewear apparatus, have an appearance of wearing a a headwear article or accessory. The example eyewear apparatus 400 resembles a sea captain's hat. FIG. 4 further shows the eyewear apparatus 400 with a right eye frame 433, a left eye frame 434, a right earpiece 410 and a left earpiece 412, which are each situated below at least (or substantially thereof) an upper portion of the forehead frame 420. The forehead frame 420, in this example, is in the shape of the captain's hat, which is curved at a top portion of the forehead frame 420. The right eye frame 433 contains a lens 430 and the left eye frame 434 contains a lens 432. The eyewear apparatus 400 further includes a bridge portion 431 for a nose of a user of the eyewear apparatus 400.

As further illustrated, the eyewear apparatus 400 includes a bill portion 450 which resembles the bill of the captain's hat. As used herein, the bill of a hat refers to a stiff peak projecting in front. FIG. 5 illustrates a side view of the eyewear apparatus 400. As shown in FIG. 5, the bill portion 450 projects outward from the forehead frame 420 and is situated above the eye frame 433.

Figure 6:
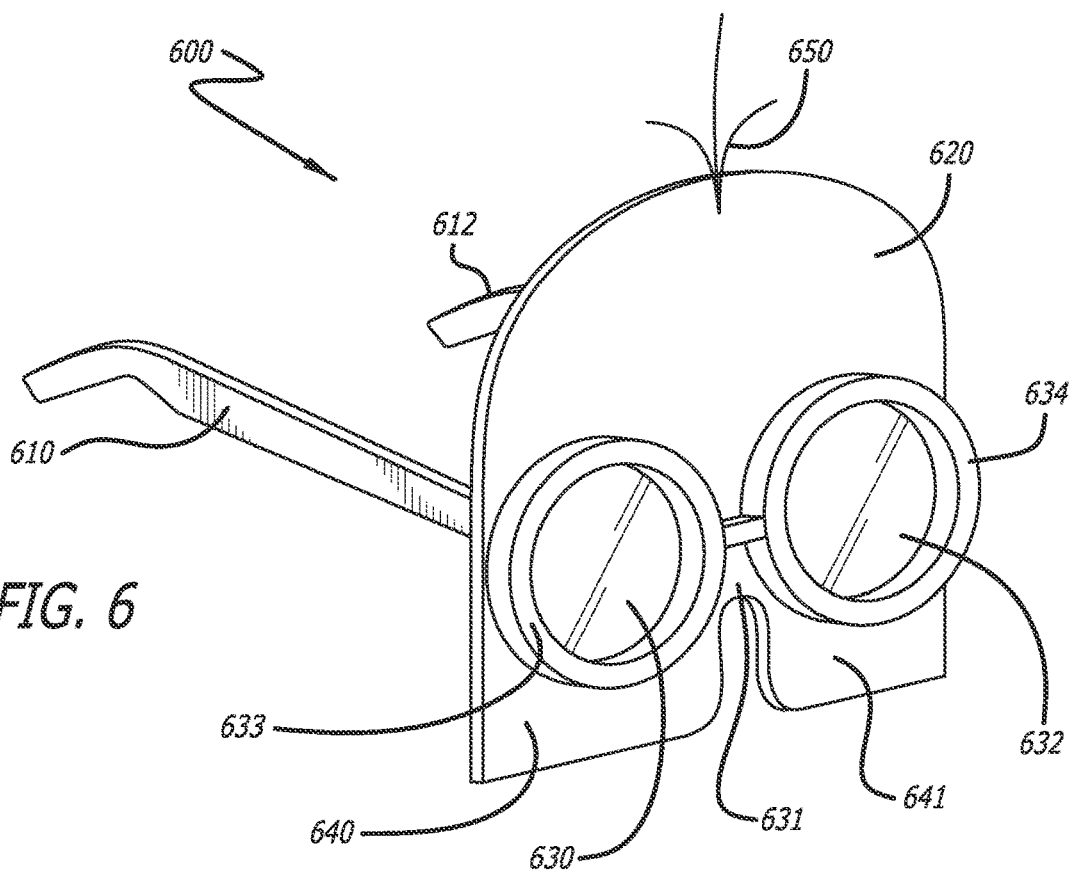
FIGS. 6 and 7 conceptually illustrate an example transformative eyewear apparatus in accordance with at least one embodiment.
Figure 7:
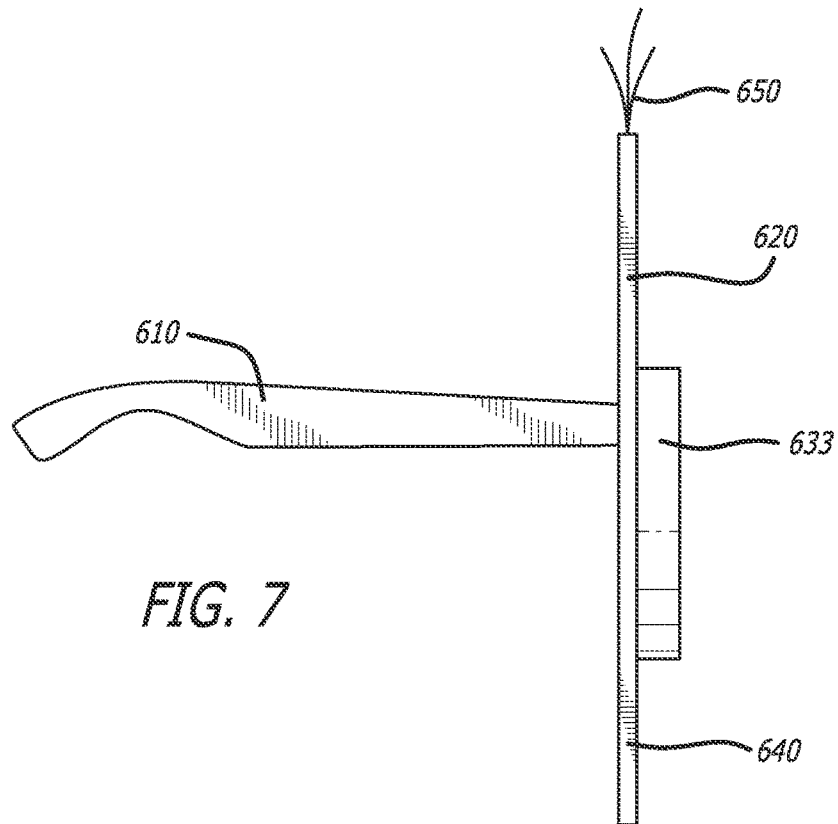

FIGS. 6 and 7 conceptually illustrates an example transformative eyewear apparatus in accordance with at least one embodiment.

As illustrated in FIG. 6, an eyewear apparatus 600 is provided that includes a structural component (e.g., resembling flexible, protruding hair attached to an additional structural component or a portion thereof) of a forehead frame 620 for making a user, when wearing the eyewear apparatus, have an appearance of a character with protruding hair. The example eyewear apparatus 600 resembles a character with some hair that protrudes upwards. FIG. 6 further shows the eyewear apparatus 600 with a right eye frame 633, a left eye frame 634, a right earpiece 610 and a left earpiece 612, which are each situated below at least (or substantially thereof) an upper portion of the forehead frame 620. The forehead frame 620, in this example, is in the shape of the forehead of the character, which is curved at a top portion of the forehead frame 620. The right eye frame 633 contains a lens 630 and the left eye frame 634 contains a lens 632. The eyewear apparatus 600 further includes a bridge portion 631 for a nose of a user of the eyewear apparatus 600. The eyewear apparatus 600 further includes a lower portion 640 and a lower portion 641 of the eyewear apparatus 600, which are situated below the right and left eye frames.

As further illustrated, the eyewear apparatus 600 includes a hair portion 650 which resembles individual strands of hair of the character. FIG. 7 illustrates a side view of the eyewear apparatus 600. As shown in FIG. 7, the hair portion 650 projects upward from the forehead frame 620 and is situated above the eye frame 633. The eye frame 633, as illustrated in FIG. 7, protrudes outward from the forehead frame 620 and is disposed above the lower portion 640 of the eyewear apparatus 600.

Figure 8:
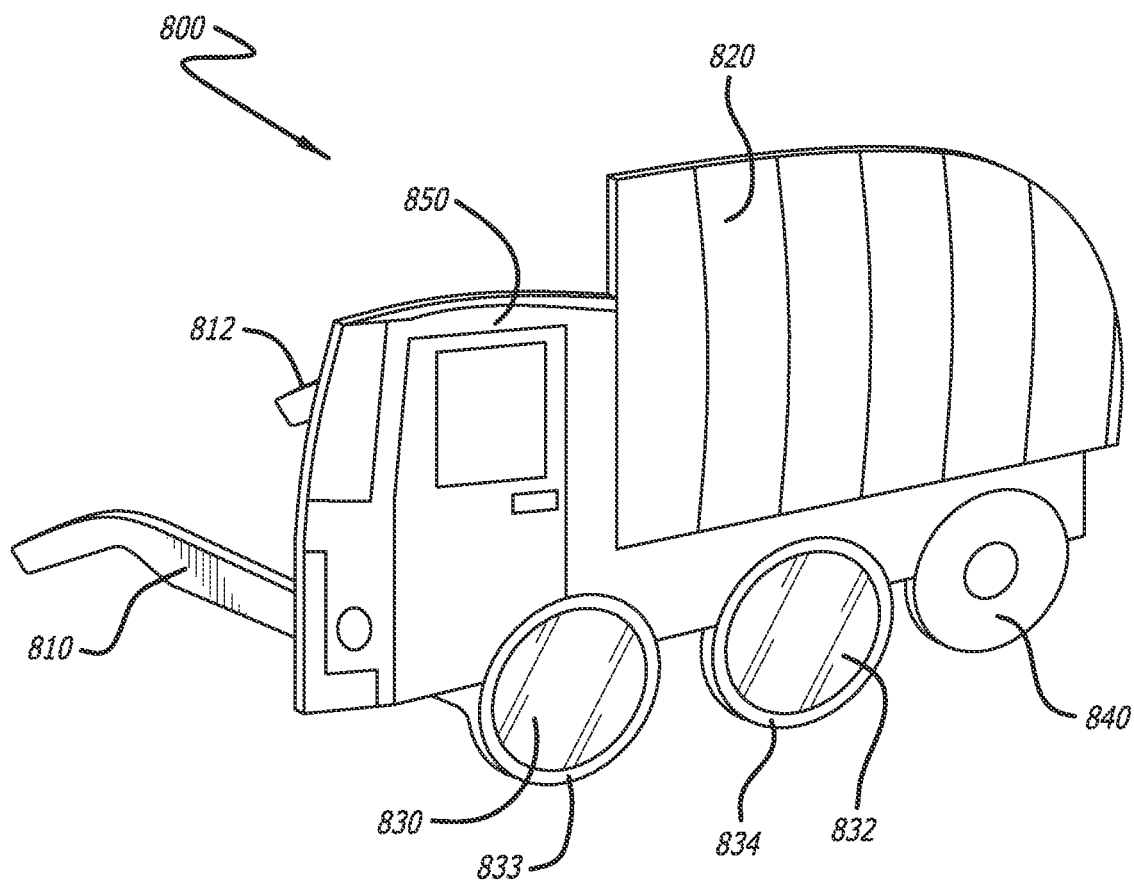
FIG. 8 conceptually illustrates an example transformative eyewear apparatus in accordance with at least one embodiment.

FIG. 8 conceptually illustrates an example transformative eyewear apparatus in accordance with at least one embodiment.

As illustrated in FIG. 8, an eyewear apparatus 800 is provided that includes a structural component (e.g., resembling objects with lenses resembling the object's wheels/tires or a portion thereof) of a forehead frame 820 for making a user, when wearing the eyewear apparatus, have an appearance of objects with lenses resembling the object's wheels/tires (e.g., a vehicle of some type in an embodiment). The eyewear apparatus 800 resembles a vehicle with wheels or tires. FIG. 8 further shows the eyewear apparatus 800 with a right eye frame 833, a left eye frame 834, a right earpiece 810 and a left earpiece 812, which are each situated below at least (or substantially thereof) the forehead frame 820. The forehead frame 820, in this example, is in the shape of a vehicle (e.g., truck). The right eye frame 833 contains a lens 830 and the left eye frame 834 contains a lens 832. Each of the lenses, based at least on their positioning with respect to the forehead frame 820, resemble wheels or tires of the vehicle. The eyewear apparatus 800 further includes a wheel portion 820, which is part of the the forehead frame 820, that resembles another wheel of the vehicle. As further illustrated, the eyewear apparatus 800 includes a portion 850 which resembles a front passenger portion of the vehicle.

Although some of the examples of FIGS. 1-8 illustrate structural components that may protrude above the eyewear frame, other implementations may be provided and still be within the scope of the subject technology. For example, eyewear attachments that protrude below or outward from the eyewear frame (e.g., below a user's nose or outward from the frame) can be implemented. Furthermore, although some of the structural components of FIGS. 1-8 may resemble characters, other configurations are contemplated, without departing from the scope of the subject technology. For example, the additional structural components can resemble television characters and people as well. Thus, it is understood that any suitable type of character, animal, person, object, etc., may be utilized and still be within the scope of the subject technology.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features, it is to be understood that the subject matter defined in the appended claims is not necessarily limited to these described features or acts. For example, such functionality can be distributed differently or performed in components other than those identified herein.

What is claimed is:

1. An eyewear apparatus comprising:
   a frame comprising a first eye piece and a second eye piece, a first ear piece and a second ear piece, wherein the first ear piece and second ear piece are coupled, respectively to the first eye piece and the second eye piece, and wherein the frame is configured to be fitted around a face of a user;
   a first lens disposed within an aperture provided by the first eye piece and a second lens disposed within an aperture provided by the second eye piece;
   a bridge portion interconnecting at least the first eye piece and the second eye piece; and
   an additional structural component located on top of the first eye piece; the second eye piece and the bridge portion of the frame, wherein the additional structural component is unitarily molded from a same piece of material as the first eye piece, the second eye piece and the bridge portion of the frame, the additional structural component including at least one structural feature protruding outward from the additional structure and representing a first portion of a face of a character, the first portion of the face of the character including a first eye and second eye of the character, wherein the additional structural component, when fitted around the face of the user, covers the user's forehead and alters the appearance of the user such that the first eye and the second eye of the character appear above the first eye piece and the second eye piece, the first eye piece and the second eye piece being a part of a second portion of the face of the character that does not include the first eye and second eye of the character; and a single elongated additional piece coupled to a bottom edge of the additional structural component, the single elongated additional piece overlapping at least a portion of both the first lens disposed within the first aperture provided by first eye piece and the second lens disposed within the second aperture provided by the second eye piece, the single elongated additional piece depicting a single feature of the character, wherein the single feature is a mouth of the character.

2. The eyewear apparatus of claim 1, wherein the additional structural component is located on the frame such that the additional structural component protrudes directly, from each respective top of each of the first eye piece, the second eye piece, and the bridge portion.

3. The eyewear apparatus of claim 1, wherein the additional structural component comprises a structural feature representing a head of the character.

4. The eyewear apparatus of claim 1, wherein the additional structural component comprises a structural feature representing at least one of a hairstyle, a forehead, and eyebrows of the character.

5. The eyewear apparatus of claim 1, wherein the additional structural component comprises a structural feature representing a headwear article.

6. The eyewear apparatus of claim 1, wherein the additional structural component comprises a structural feature representing protective headwear.

7. The eyewear apparatus of claim 1, wherein the additional structural component comprises a structural feature representing non-protective sports equipment.

8. The eyewear apparatus of claim 1, wherein the additional structural component comprises a structural feature representing individual strands of hair of the character.

* * * * *